US008333861B2

(12) United States Patent
Camp

(10) Patent No.: US 8,333,861 B2

(45) Date of Patent: Dec. 18, 2012

(54) FORMING A FLEXIBLE WALL FOR AN INK TANK

(75) Inventor: Alphonse D. Camp, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 151 days.

(21) Appl. No.: 12/955,077

(22) Filed: Nov. 29, 2010

(65) Prior Publication Data

US 2012/0132696 A1 May 31, 2012

(51) Int. Cl.

*B29C 65/00* (2006.01)
*B32B 37/00* (2006.01)
*B32B 38/04* (2006.01)

(52) U.S. Cl. ........ 156/267; 156/198; 156/212; 156/216; 156/285; 156/308.2; 156/308.4; 156/256; 156/163; 347/86

(58) Field of Classification Search .................... 347/86; 156/198, 212, 216, 285, 308.2, 308.4, 267, 156/256, 163; 30/131, 1; 83/15

See application file for complete search history.

(56) References Cited

U.S. PATENT DOCUMENTS

| | | | |
|---|---|---|---|
| 5,754,207 | A | 5/1998 | Gragg et al. |
| 5,912,688 | A | 6/1999 | Gragg |
| 7,086,725 | B2 | 8/2006 | Ogura et al. |
| 2001/0012039 | A1 | 8/2001 | Kanaya et al. |
| 2003/0090553 | A1 | 5/2003 | Jung et al. |
| 2003/0122909 | A1 | 7/2003 | Ogura et al. |
| 2007/0145059 | A1 | 6/2007 | Ogura et al. |
| 2009/0309940 | A1 | 12/2009 | Price |
| 2010/0053280 | A1 | 3/2010 | Ohashi et al. |

FOREIGN PATENT DOCUMENTS

| | | |
|---|---|---|
| EP | 0745482 | 12/1996 |
| EP | 2085226 | 8/2009 |

*Primary Examiner* — Linda L Gray

(74) *Attorney, Agent, or Firm* — Peyton C. Watkins

(57) ABSTRACT

A method for forming a reservoir for holding ink in an ink tank, the method includes providing a housing; inserting a spring into the housing such that a first end of the spring contacts a back wall of the housing; placing a first surface of a plate against a second end of the spring; bringing a flexible sheet into contact with an edge of a side wall of the housing; welding the flexible sheet to the edge of the side wall of the housing while applying a first level of vacuum between the flexible sheet and the back wall of the housing; and applying heat to the flexible sheet in a region corresponding to the plate while applying a second level of vacuum between the flexible sheet and the back wall of the housing, wherein the second level of vacuum is greater than the first level.

12 Claims, 16 Drawing Sheets

FORMING A FLEXIBLE WALL FOR AN INK TANK

CROSS-REFERENCE TO RELATED APPLICATIONS

Reference is made to commonly assigned, co-pending U.S. Patent Application Ser. No. 12/955,059 filed Nov. 29, 2010, entitled: "Ink Tank with Flexible Wall", the disclosure of which is incorporated herein.

FIELD OF THE INVENTION

The present invention relates generally to an ink tank for an inkjet printhead, and more particularly to a flexible wall of the ink tank.

BACKGROUND OF THE INVENTION

An inkjet printing system typically includes one or more printheads and their corresponding ink supplies. Each printhead includes an ink inlet that is connected to its ink supply and an array of drop ejectors, each ejector consisting of an ink pressurization chamber, an ejecting actuator and a nozzle through which droplets of ink are ejected. The ejecting actuator may be one of various types, including a heater that vaporizes some of the ink in the pressurization chamber in order to propel a droplet out of the orifice, or a piezoelectric device which changes the wall geometry of the chamber in order to generate a pressure wave that ejects a droplet. The droplets are typically directed toward paper or other recording medium in order to produce an image according to image data that is converted into electronic firing pulses for the drop ejectors as the recording medium is moved relative to the printhead.

A common type of printer architecture is the carriage printer, where the printhead nozzle array is somewhat smaller than the extent of the region of interest for printing on the recording medium and the printhead is mounted on a carriage. In a carriage printer, the recording medium is advanced a given distance along a media advance direction and then stopped. While the recording medium is stopped, the printhead carriage is moved in a direction that is substantially perpendicular to the media advance direction as the drops are ejected from the nozzles. After the carriage has printed a swath of the image while traversing the recording medium, the recording medium is advanced; the carriage direction of motion is reversed, and the image is formed swath by swath.

The ink supply on a carriage printer can be mounted on the carriage or off the carriage. For the case of ink supplies being mounted on the carriage, the ink tank can be permanently integrated with the printhead as a print cartridge so that the printhead needs to be replaced when the ink is depleted, or the ink tank can be detachably mounted to the printhead so that only the ink tank itself needs to be replaced when the ink tank is depleted.

One type of detachable ink tank includes a porous member (also called a wick or scavenger member) at the ink outlet port. The printhead inlet port can include a standpipe, for example, with a filter member at its inlet end. When the ink tank is mounted onto the printhead, the ink tank wick is held in contact with the filter member on the standpipe of the printhead inlet port. The ink outlet port of the ink tank includes a rim having a face that seals against a gasket surrounding the inlet port of the printhead when the ink tank is installed. The gasket seal provides a substantially airtight ink pathway from the ink tank to the printhead. Once the printhead is primed so that liquid ink fills the various ink passageways between the wick and the nozzles on the printhead, capillary action provides the force necessary to supply the ink to the nozzles as needed for printing. Such an ink tank facilitates easy and clean installation onto the printhead.

Some types of ink tanks also include capillary media such as felt or foam that is used to retain ink inside the ink tank and provide a slight negative ink pressure so that ink does not drip out of the nozzles of the printhead. This ink-retaining capillary media thus serves as a pressure regulator and provides ink to the wick at the ink outlet port.

It has been found that pigment particles in a pigmented ink can settle out in ink tank designs where ink is stored in a capillary media pressure regulator, partly due to the restriction of motion of pigment particles within the small passages of the capillary media, as described in more detail in US Patent Application Publication Number US20090309940. Such settling of pigments particles, especially for larger pigment particles (e.g. larger than 30 nanometers), can result in defective images during the printing process. As a result, an ink tank using capillary media to store ink can lead to a limitation in pigment particle size that can be used. Such a limitation can be disadvantageous, because such larger particles can be beneficial for providing higher optical density in printed regions.

A different type of pressure regulator for an ink tank is a bag (or flexible wall) with a spring that provides pressure regulation for a supply of liquid ink within a reservoir of the ink tank. Such ink tanks can have less tendency for settling out of pigment particles than for the case of ink stored in capillary media. In addition, as disclosed in U.S. Pat. No. 7,086,725, an ink tank having a flexible wall or a bag and a spring for pressure regulation can provide ink from the reservoir more efficiently (i.e. less ink trapped in the depleted reservoir) than an ink tank using capillary media ink storage to perform pressure regulation. This allows a more compact design of ink tank, printhead and printer for a given amount of usable ink in the ink tank. U.S. Pat. No. 7,086,725 also discloses ways of forming the flexible wall. In a comparative example with reference to FIG. 8 of U.S. Pat. No. 7,086,725, the movable flexible wall is formed into its shape by injecting ink between a flat sheet member and the frame of the ink container. By contrast, it is disclosed, with reference to FIGS. 11 and 13, according to an embodiment of U.S. Pat. No. 7,086,725 to form a convex shape of the movable flexible wall by using a forming die having a convex shape and then cutting the movable flexible wall member to size for subsequent welding of the perimeter of the flexible wall to the frame of the ink container. Likewise, for a different configuration of ink tank, US Patent Application Publication Number 20100053280 discloses in paragraph 53 the pre-forming of the convex shape of the flexible wall member.

It has been found that the above-mentioned ways of forming a flexible wall member can be cumbersome to implement. What is needed is an ink tank and method for making the ink tank in which the flexible wall is formed in a simpler and less costly fashion.

SUMMARY OF THE INVENTION

The present invention is directed to overcoming one or more of the problems set forth above. Briefly summarized, according to one aspect of the invention, the invention resides in A method for forming a reservoir for holding ink in an ink tank for an inkjet printhead, the method comprising a) providing a housing including a back wall and a side wall extending from the back wall; b) inserting a spring into the housing such that a first end of the spring contacts the back wall of the housing; c) placing a first surface of a plate against a second end of the spring; d) providing a flexible sheet; e) bringing the flexible sheet into contact with an edge of the side wall of the housing; f) welding the flexible sheet to the edge of the side wall of the housing while applying a first level of vacuum between the flexible sheet and the back wall of the housing; and g) applying heat to the flexible sheet in a region corresponding to the plate while applying a second level of vacuum between the flexible sheet and the back wall of the housing, wherein the second level of vacuum is greater than the first level, thereby causing the sheet to conform to a second surface of the plate that is opposite the first surface of the plate, as well as to internal features of the housing.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
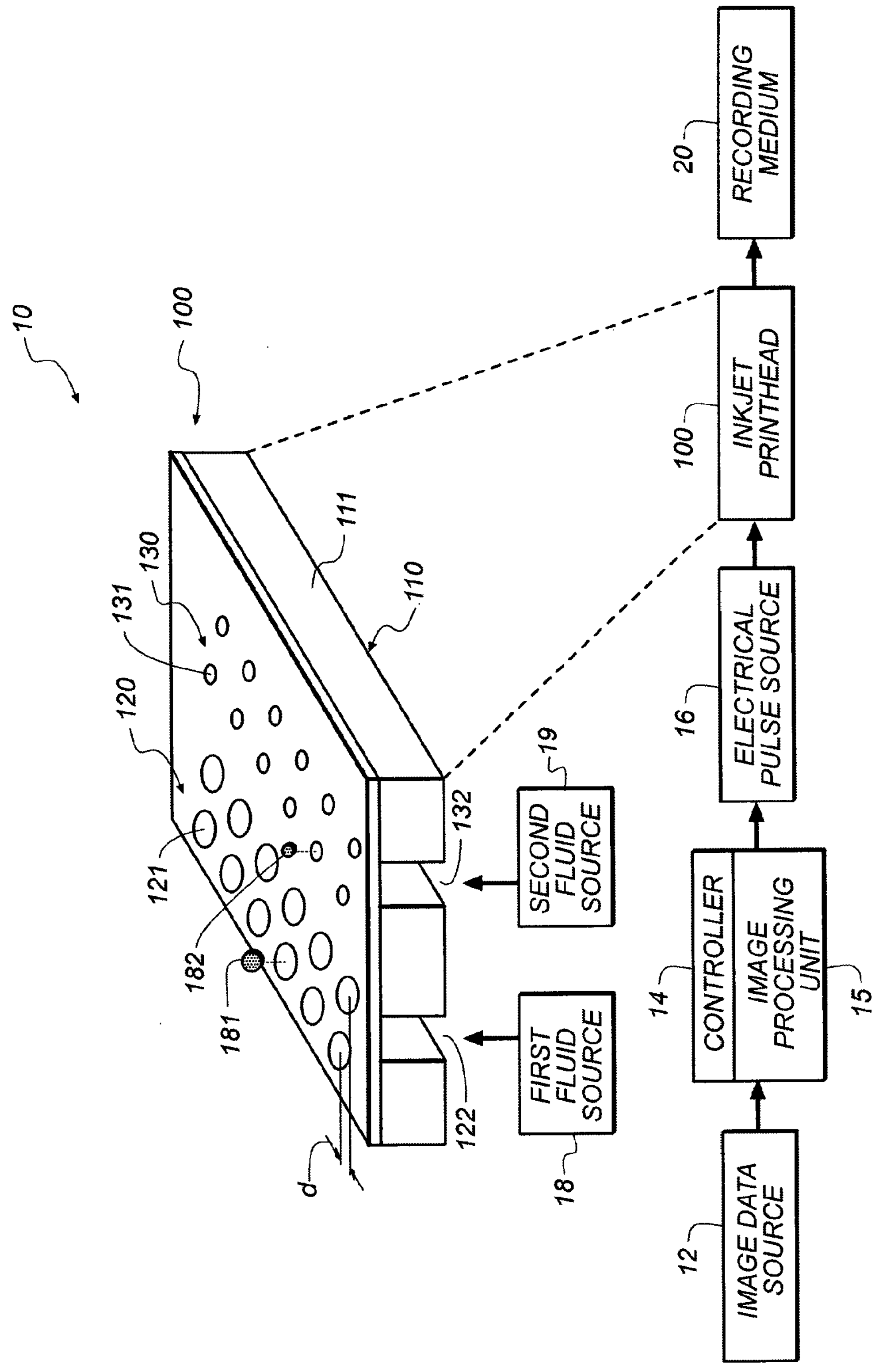
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. d=1/1200 inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. The printhead die are arranged on a support member as discussed below relative to FIG. 2. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to both the first nozzle array 120 and the second nozzle array 130 via ink delivery pathways 122 and 132 respectively. Also, in some embodiments, fewer than two or more than two nozzle arrays can be included on printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
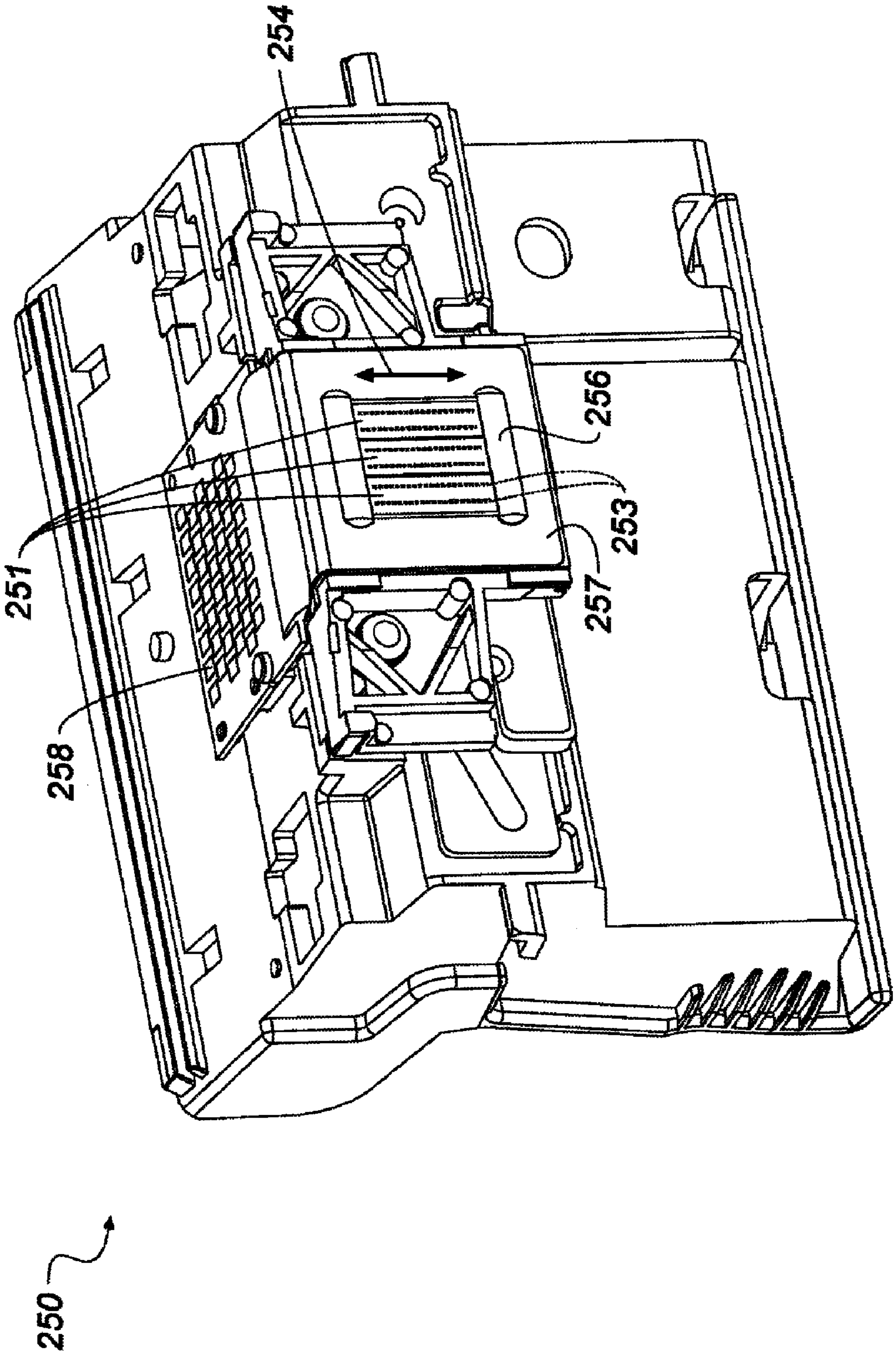
FIG. 2 is a perspective view of a portion of a printhead.

FIG. 2 shows a perspective view of a portion of a printhead 250, which is an example of an inkjet printhead 100. Printhead 250 includes three printhead die 251 (similar to printhead die 110 in FIG. 1), each printhead die 251 containing two nozzle arrays 253, so that printhead 250 contains six nozzle arrays 253 altogether. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along nozzle array direction 254, and the length of each nozzle array along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead 250 across the recording medium 20. Following the printing of a swath, the recording medium 20 is advanced along a media advance direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead 250 and connects to connector board 258. When printhead 250 is mounted into the carriage 200 (see FIG. 3), connector board 258 is electrically connected to a connector (not shown) on the carriage 200, so that electrical signals can be transmitted to the printhead die 251.

Figure 3:
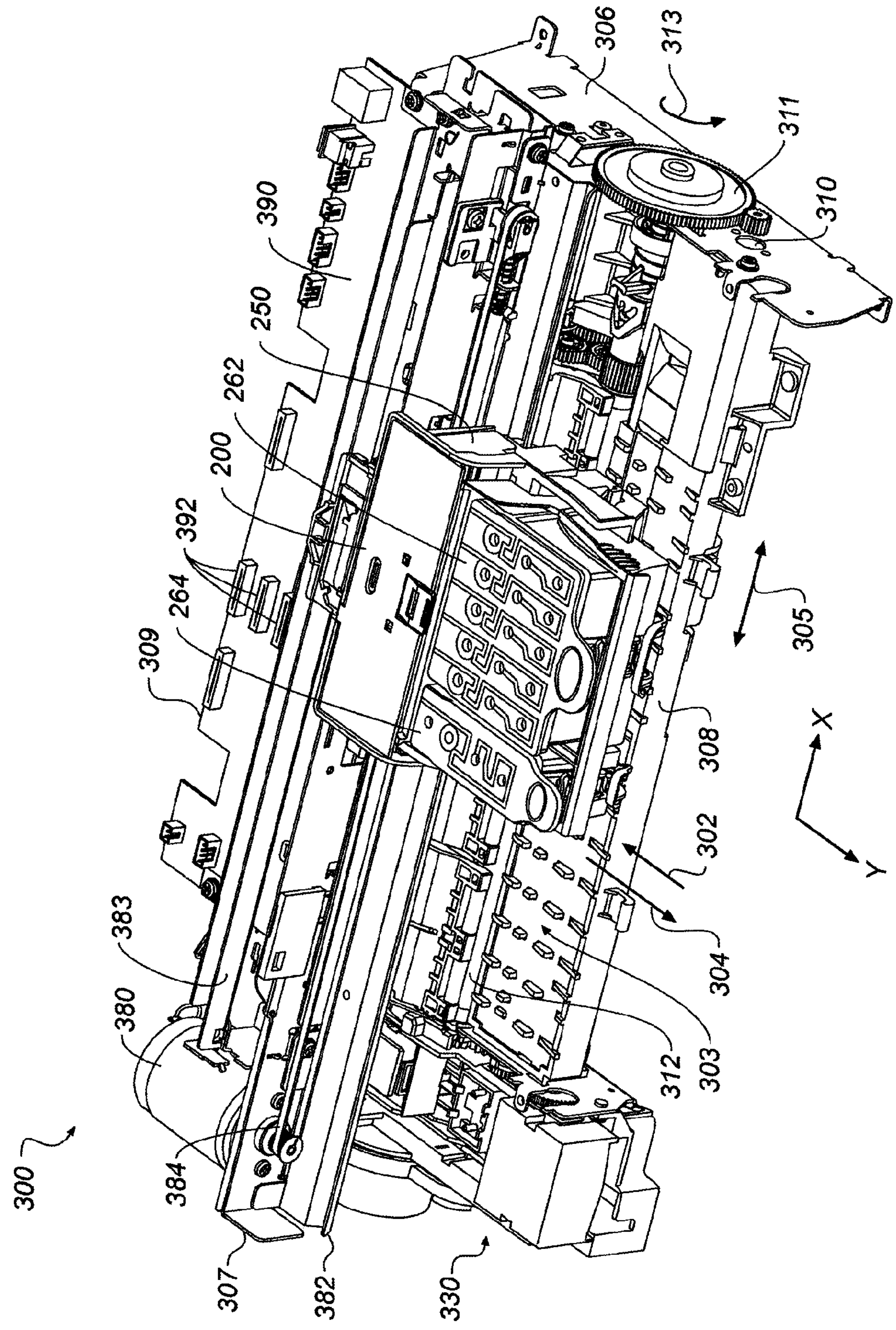
FIG. 3 is a perspective view of a portion of a carriage printer.

FIG. 3 shows a portion of a desktop carriage printer. Some of the parts of the printer have been hidden in the view shown in FIG. 3 so that other parts can he more clearly seen. Printer chassis 300 has a print region 303 across which carriage 200 is moved back and forth in carriage scan direction 305 along the X axis, between the right side 306 and the left side 307 of printer chassis 300, while drops are ejected from printhead die 251 (not shown in FIG. 3) on printhead 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead 250 is mounted in carriage 200, and multi-chamber ink tank 262 and single-chamber ink tank 264 are installed in the printhead 250. A printhead together with installed ink tanks is sometimes called a printhead assembly. The mounting orientation of printhead 250 is rotated relative to the view in FIG. 2, so that the printhead die 251 are located at the bottom side of printhead 250, the droplets of ink being ejected downward onto the recording medium in print region 303 in the view of FIG. 3. Multi-chamber ink tank 262, in this example, contains live ink sources: cyan, magenta, yellow, photo black, and colorless protective fluid; while single-chamber ink tank 264 contains the ink source for text black. In other embodiments, rather than having a multi-chamber ink tank to hold several ink sources, all ink sources are held in individual single chamber ink tanks.

Figure 4:
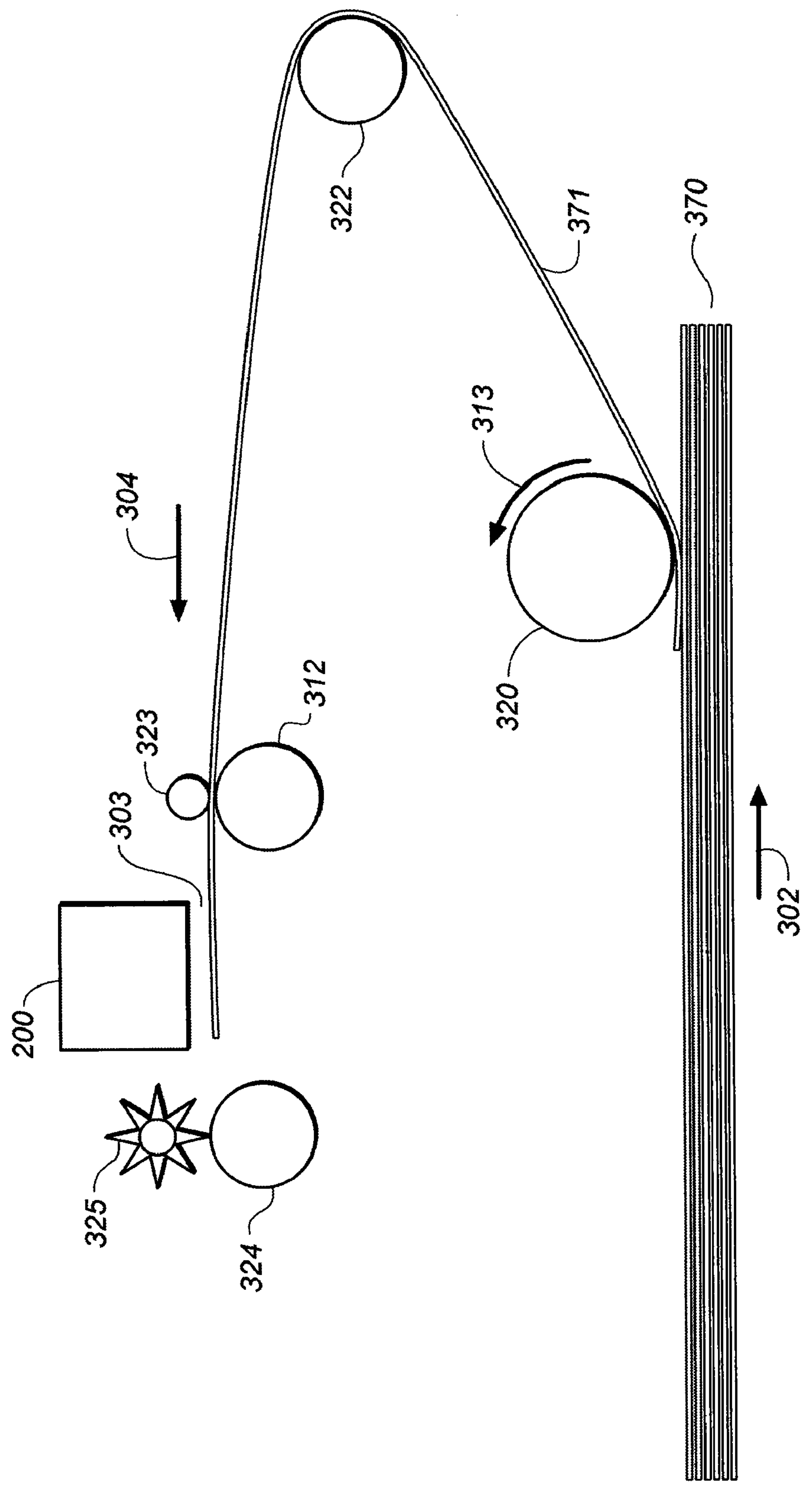
FIG. 4 is a schematic side view of an exemplary paper path in a carriage printer.

Paper or other recording medium (sometimes generically referred to as paper or media herein) is loaded along paper load entry direction 302 toward the front of printer chassis 308. A variety of rollers are used to advance the medium through the printer as shown schematically in the side view of FIG. 4. In this example, a pick-up roller 320 moves the top piece or sheet 371 of a stack 370 of paper or other recording medium in the direction of arrow, paper load entry direction 302. A turn roller 322 acts to move the paper around a C-shaped path (in cooperation with a curved rear wall surface) so that the paper continues to advance along media advance direction 304 from the rear 309 of the printer chassis (with reference also to FIG. 3). The paper is then moved by feed roller 312 and idler roller(s) 323 to advance along the Y axis across print region 303, and from there to a discharge roller 324 and star wheel(s) 325 so that printed paper exits along media advance direction 304. Feed roller 312 includes a feed roller shaft along its axis, and feed roller gear 311 is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 3, but the hole 310 at the right side of the printer chassis 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printer chassis 307, in the example of FIG. 3, is the maintenance station 330.

Toward the rear of the printer chassis 309, in this example, is located the electronics board 390, which includes cable connectors 392 for communicating via cables (not shown) to the printhead carriage 200 and from there to the printhead 250. Also on the electronics board are typically mounted motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Figure 5:
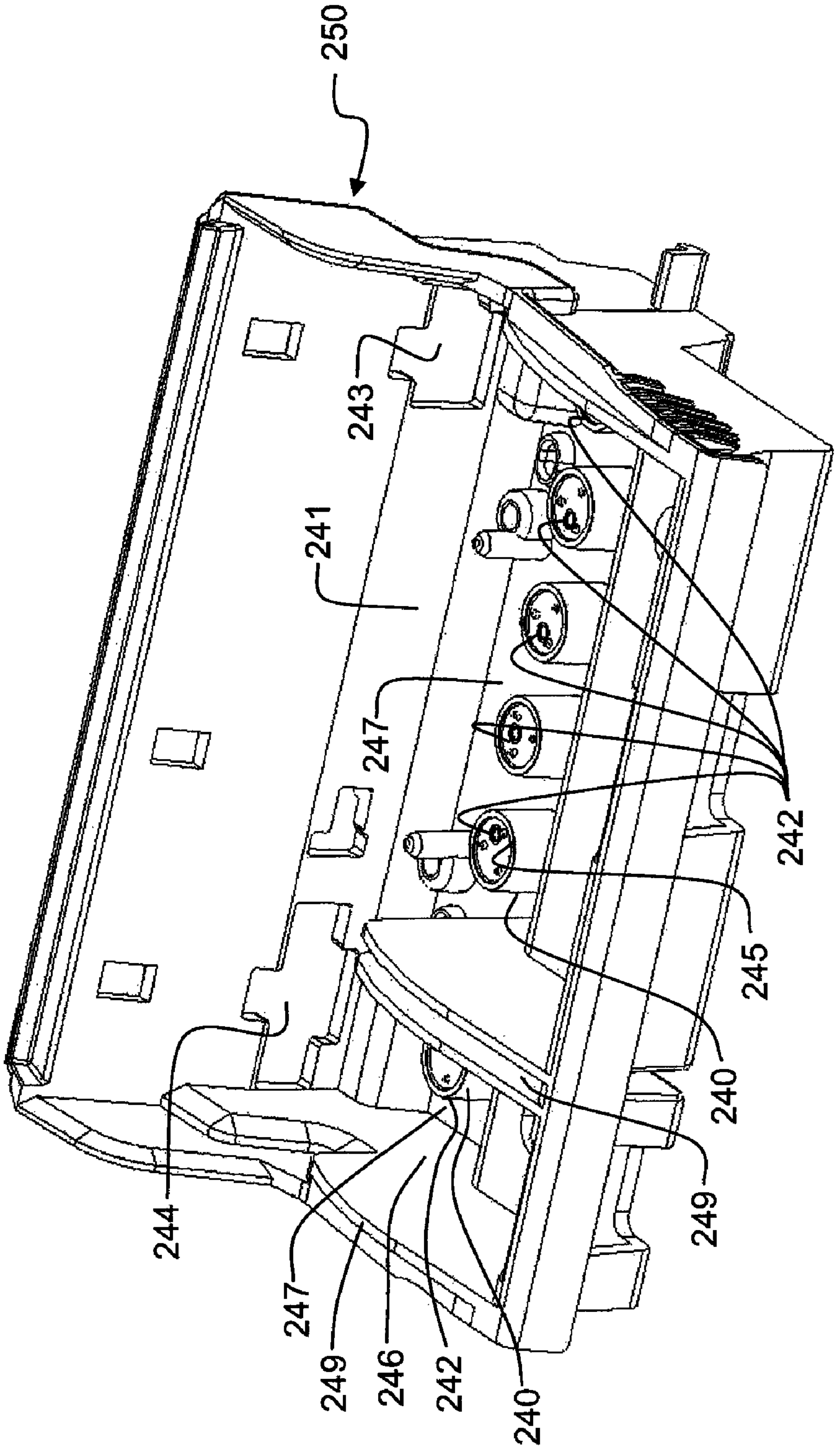
FIG. 5 is a perspective view of a portion of a printhead.

FIG. 5 shows a perspective view of printhead 250 (rotated with respect to the view of FIG. 2) without either replaceable ink tank 262 or 264 mounted onto it. Multi-chamber ink tank 262 is detachably mountable in ink tank holding receptacle 241 and single chamber ink tank 264 is detachably mountable in ink tank holding receptacle 246 of printhead 250. Ink tank holding receptacle 241 is separated from ink tank holding receptacle 246 by a wall 249, which can also help guide the ink tanks during installation. In some embodiments, pedestal 280 (see FIG. 6) of single chamber ink tank 264 is inserted into hole 244 of printhead 250 during mounting of the single chamber ink tank 264. A similar pedestal (not shown) on multi-chamber ink tank 262 is inserted into hole 243 of printhead 250 during mounting of the single chamber ink reservoir 264. Five inlet ports 242 are shown in region 241 that connect with ink outlet ports (not shown) of multi-chamber ink tank 262 when it is installed onto printhead 250, and one inlet port 242 is shown in region 246 for the ink supply port 275 (sec FIG. 6) on the single chamber ink tank 264. In the example of FIG. 5 each inlet port 242 has the form of a standpipe 240 that extends from the floor of printhead 250. Typically a filter (such as woven or mesh wire filter, not shown) covers the end 245 of the standpipe 240. The diameter of end 245 of standpipe 240 is smaller than that of the opening of ink supply port 275 (see FIG. 6) of ink tank 262 or 264, so that the end 245 of each standpipe 240 is pressed into contact with a corresponding wick 276 at the opening of ink supply port 275. In other words, wick 276 serves as a printhead interface member for the ink tank. On the floor of printhead 250 surrounding standpipes 240 of inlet ports 242 is an elastomeric gasket 247. When an ink tank is installed into the corresponding ink tank holding receptacle 241 or 246 of printhead 250, it is in fluid communication with the printhead because of the connection of the wicks 276 at ink supply ports 272 with the ends 245 of standpipes 240 of inlet ports 242.

Figure 6:
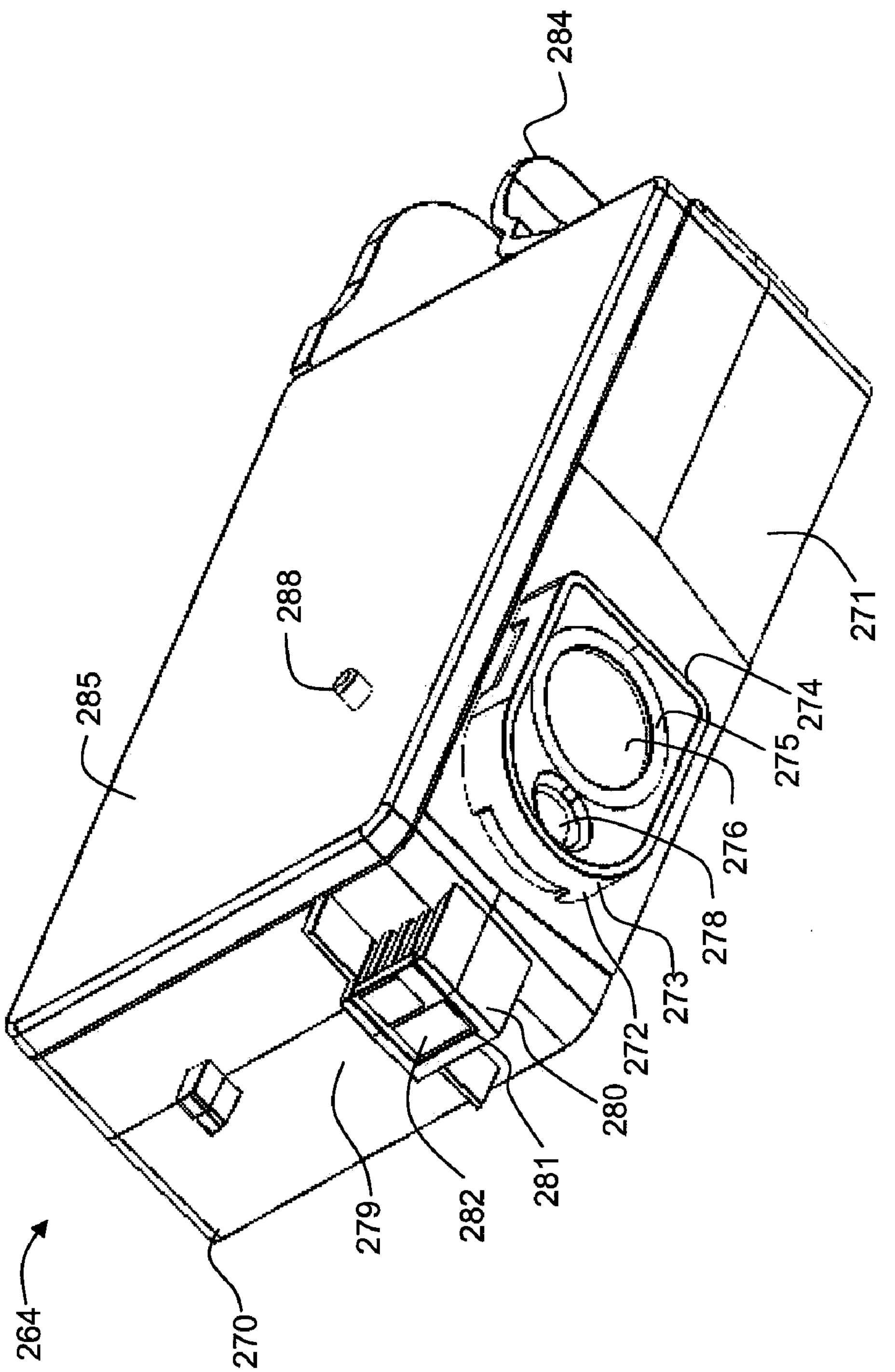
FIGS. 6-8 are perspective views of an ink tank that can be formed according to an embodiment of the invention.
Figure 7:
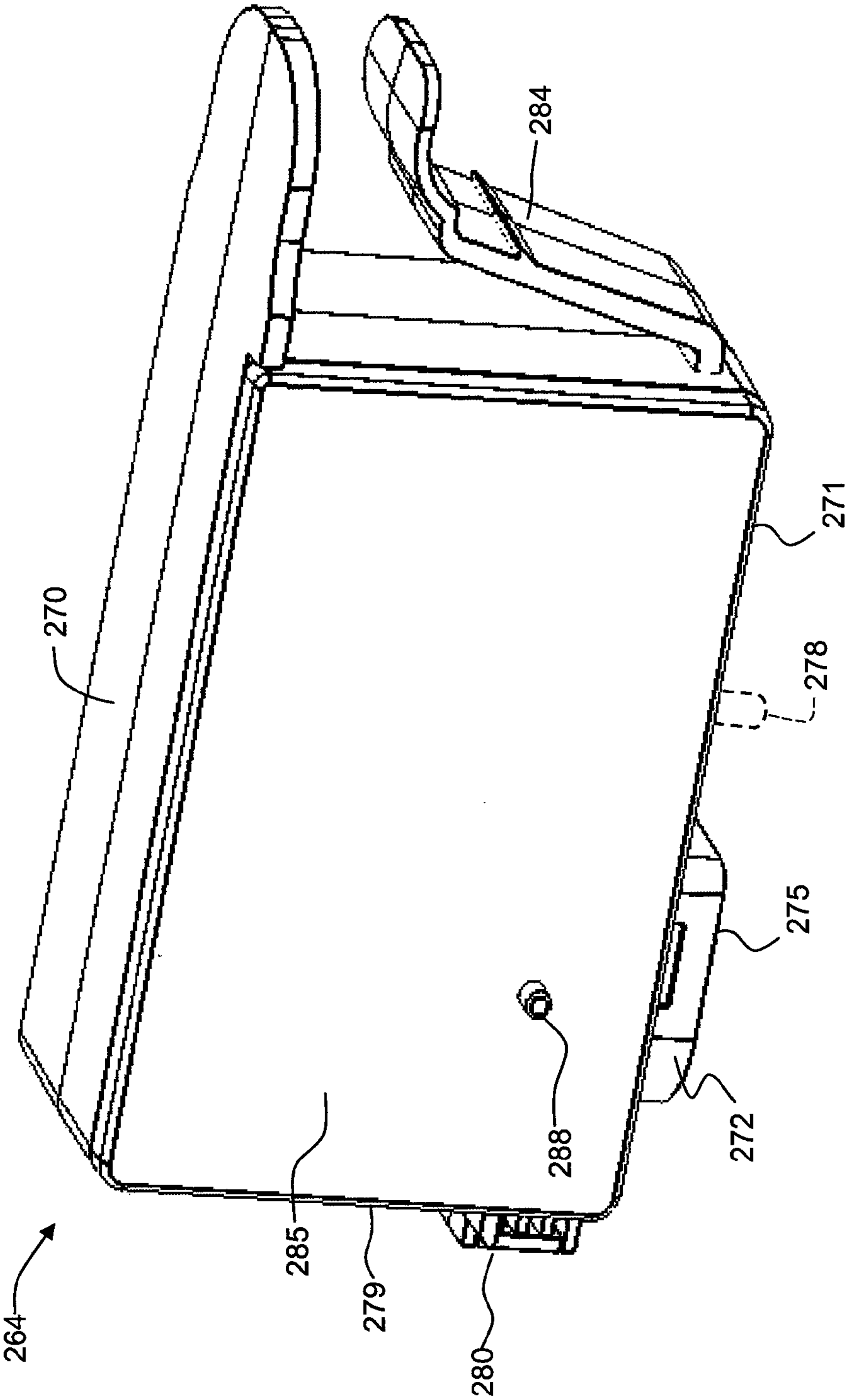
Figure 8:
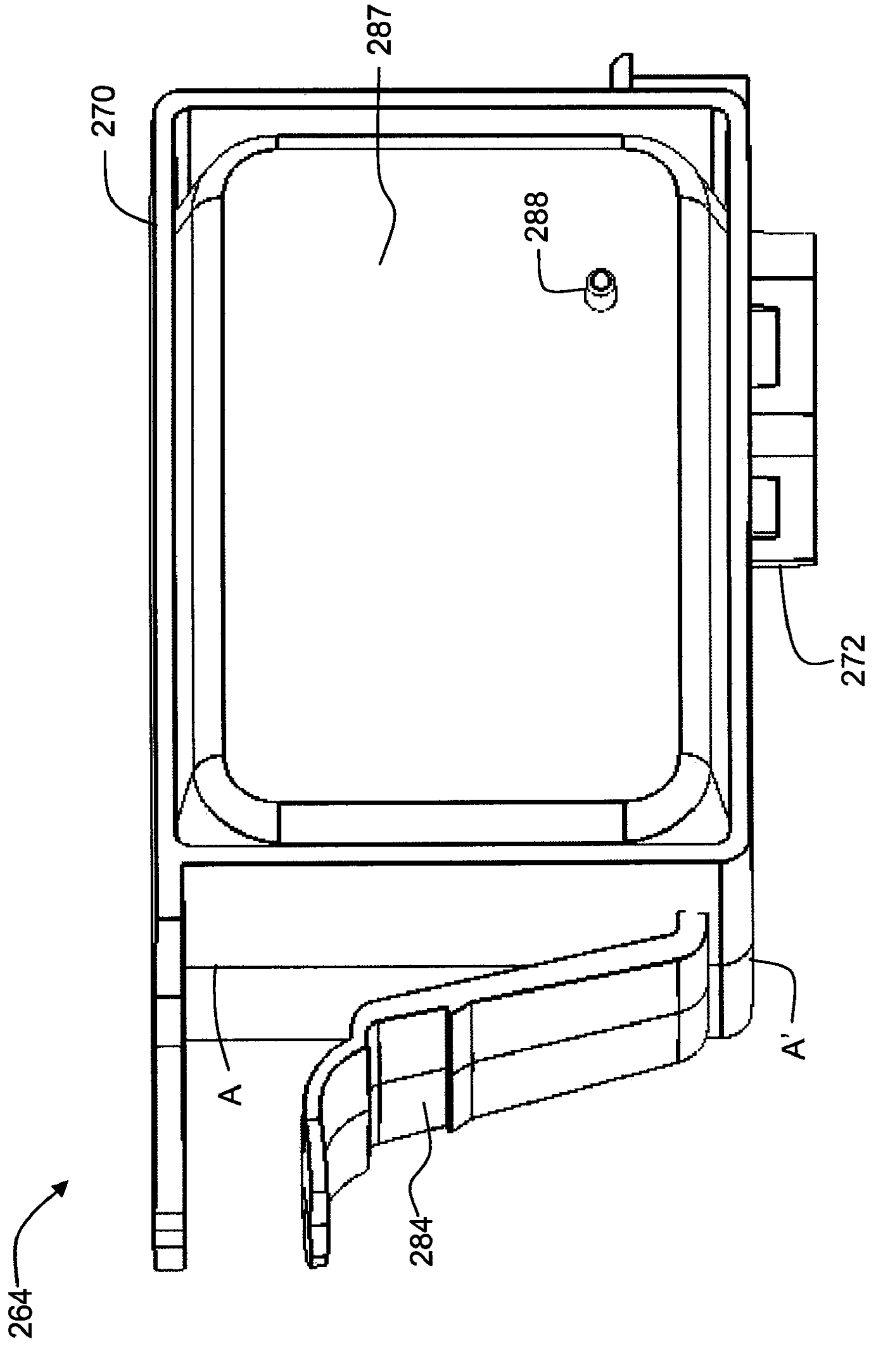

FIG. 6 shows a bottom perspective view and FIGS. 7 and 8 show side perspective views of opposite side faces of single chamber ink tank 264 that can be made according to an embodiment of the invention. Enclosed within housing 270 of the ink tank is a reservoir for liquid ink. Port member 272 extends from a bottom wall 271 of housing 270. Port member 272 has an external rim 273, which is oblong shaped. Rim 273 typically extends outwardly from the housing 270 by one centimeter or less. Enclosed within rim 273 are ink supply port 275 and ink fill port 278, as described in more detail in U.S. patent application Ser. No. 12/642,883, the disclosure of which is incorporated herein in its entirety. Ink fill port 278 need not be enclosed within rim 273. In some embodiments of the invention, ink fill port 278 can be located at a separate location, such as the location indicated by the dashed lines in FIG. 7. Wick 276 is disposed at the opening of ink supply port 275 for transferring of ink from the reservoir of single chamber ink tank 264 to the corresponding inlet port of printhead 250. Wick 276 is a capillary medium that can be made of a fibrous material (such as a felted material) or a sintered material (such as a sintered plastic) in various embodiments. Rim 273 includes a face 274 that is configured to be sealingly fitted against gasket 247 of printhead 250 (see FIG. 5). Face 274 of rim 273 is pressed into contact with gasket 247 of printhead 250 (see FIG. 5) to form a seal when the ink tank is installed in printhead 250. The seal of face 274 against gasket 247 helps to prevent air leakage into printhead 250, as air bubbles can block the flow of ink in small ink passageways and thereby degrade print quality. A latching lever 284 extends outwardly from housing 270 in order to secure the single chamber ink tank 264 into ink tank holding receptacle 246 when the ink tank is installed in printhead 250.

Outer cover 285 is attached to one side of housing 270 (FIG. 7) while rigid back wall 287 on the opposite side is integrally formed with housing 270 (FIG. 8). Extending outwardly from both outer cover 285 and rigid hack wall 287 are protrusions 288 that ride on walls 249 of ink tank holding receptacle 246 (see FIG. 5) during ink tank installation. In some embodiments, a pedestal 280 extends outwardly from a different wall 279 of housing 270 than the wall 271 from which rim 273 extends. Mounted on pedestal 280 is an electrical device 281 including electrical contacts 282. Electrical device 281 can be a memory device or'a "smart chip" for storing information about the ink tank and its contents, as well as usage of ink, for example. Alternatively, electrical device 281 can be as simple as a passive circuit with electrical contacts 282 in order to signal to the printer controller 14 that the ink tank has been properly installed in a printhead 250 in carriage 200. Electrical contacts 282 of electrical device 281 make contact with an electrical connector (not shown) on carriage 200, as pedestal 280 extends though hole 243 or 244 in printhead 250 (see FIG. 5).

Figure 9:
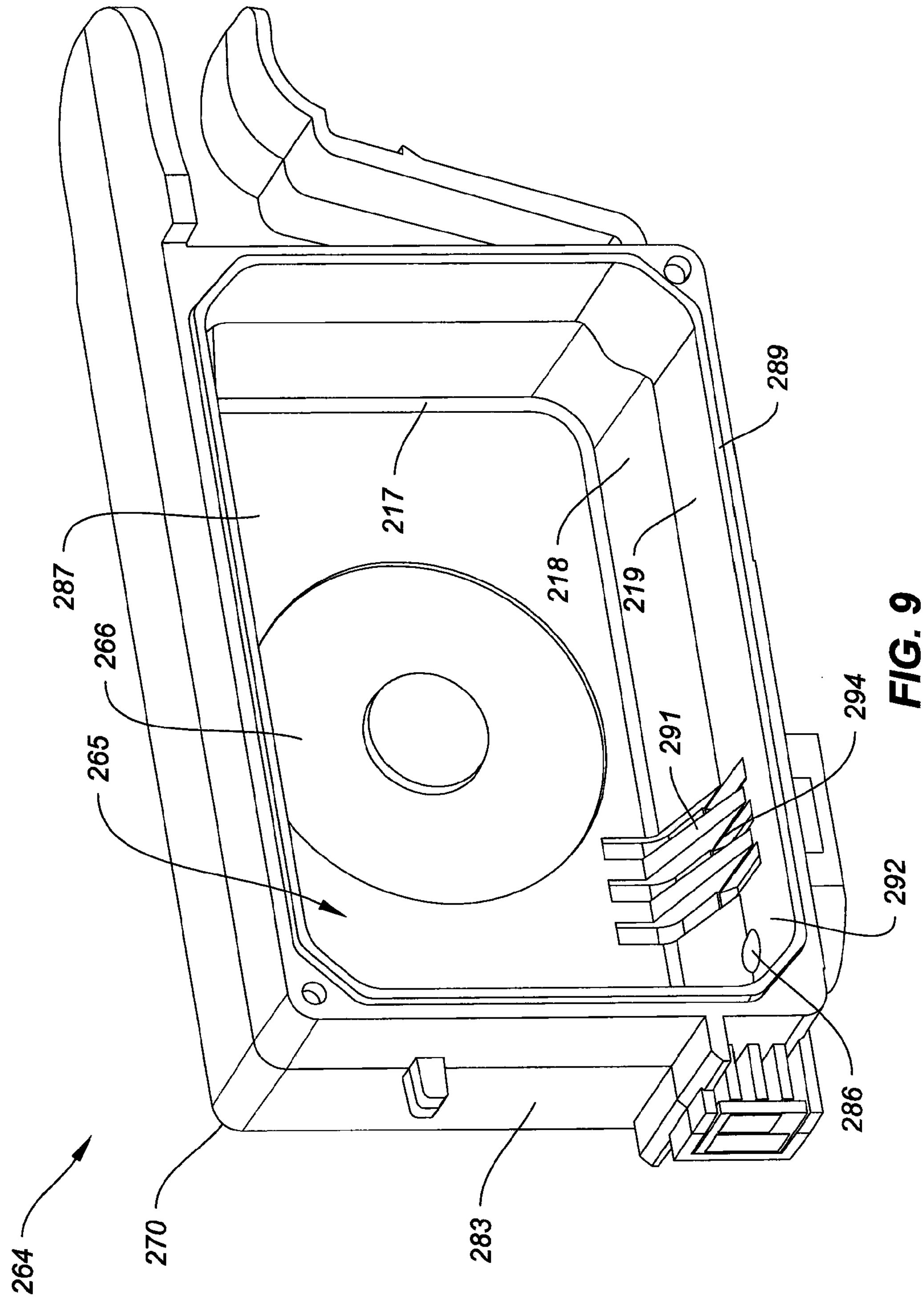
FIG. 9 is an interior perspective view of an ink tank housing according to an embodiment of the invention.
Figure 10:
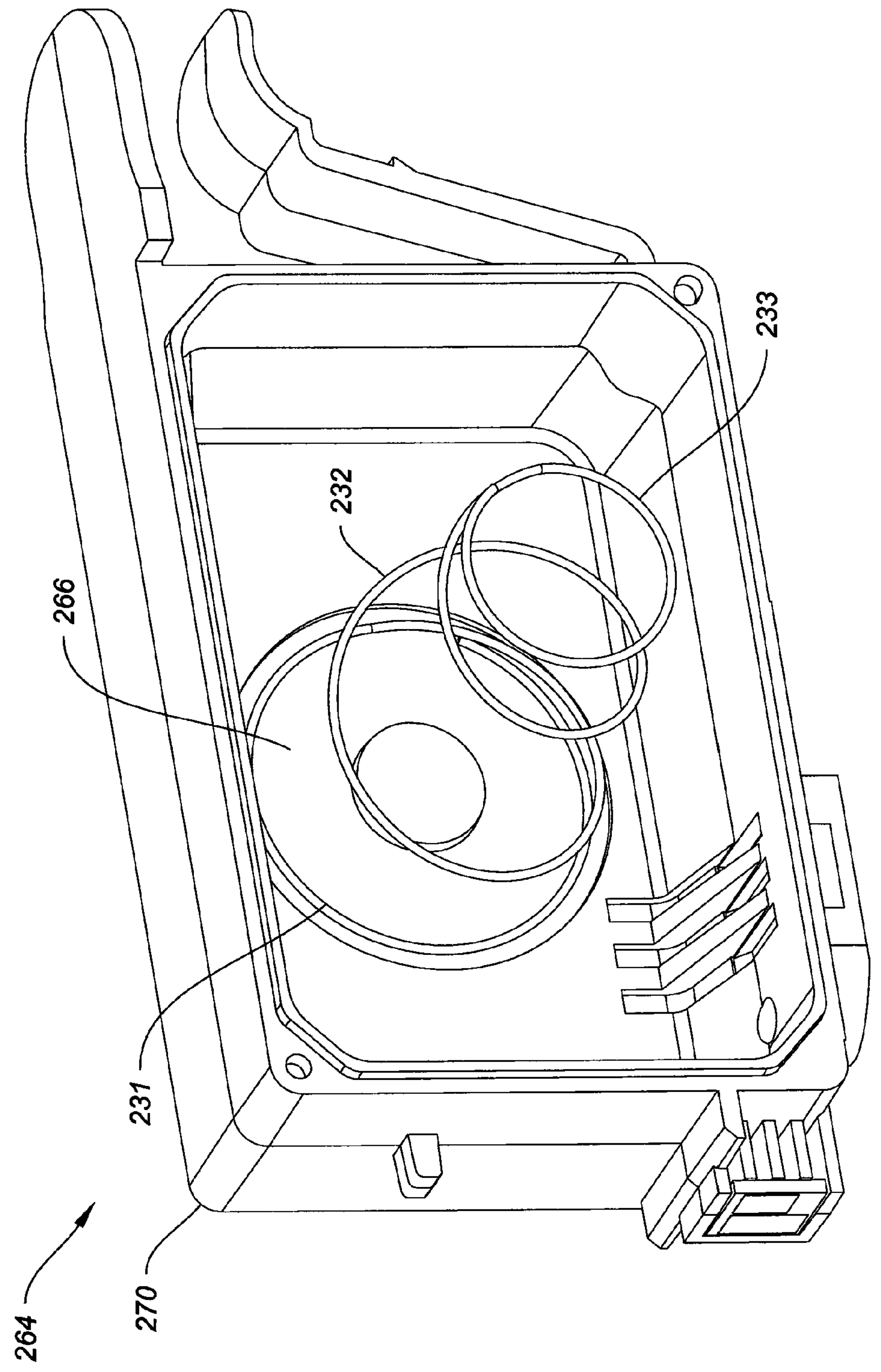
FIG. 10 is a perspective view of a spring inserted into the ink tank housing of FIG. 9.

As shown in FIG. 9, housing 270 of single chamber ink tank 264 includes a back wall 287, and a side wall 283 extending around the periphery of back wall 287. Side wall 283 includes walls 271 and 279 described above relative to FIGS. 6 and 7, as well as the walls opposite those walls. Side wall 283 also includes an edge 289. Back wall 287 and side wall 283 form part of an enclosure for a reservoir 265 for ink. The internal corner 217 between back wall 287 and side wall 283 is chamfered, and a first portion 218 of side wall 283 is inclined slightly relative to a second portion 219 of side wall 283, as described in more detail below. A flexible wall (not shown), described in further detail below, is attached to edge 289 to form the remaining part of the enclosure for reservoir 265. Hole 286 is connected to ink fill port 278 and ends flush with interior surface 292 so that reservoir 265 can be filled all the way full with ink. Ribs 291 hold the flexible wall away from interior surface 292. When the ink tank 264 is oriented as in FIG. 9, ink can pass through ink slots 294 into ink supply port 275. Back wall 287 includes a recess 266 to accommodate a first end 231 of a spring 232, as shown in FIG. 10. The second end 233 of spring 232 is accommodated in a recess 267 in a first surface 238 of plate 234 (see FIG. 11). Hooks 236 help to affix second end 233 of spring 232 to plate 234. Plate 234 in this example is rectangular shaped with rounded corners 216. It has a perimeter 235 and optionally has one or more holes 237.

Figure 11:
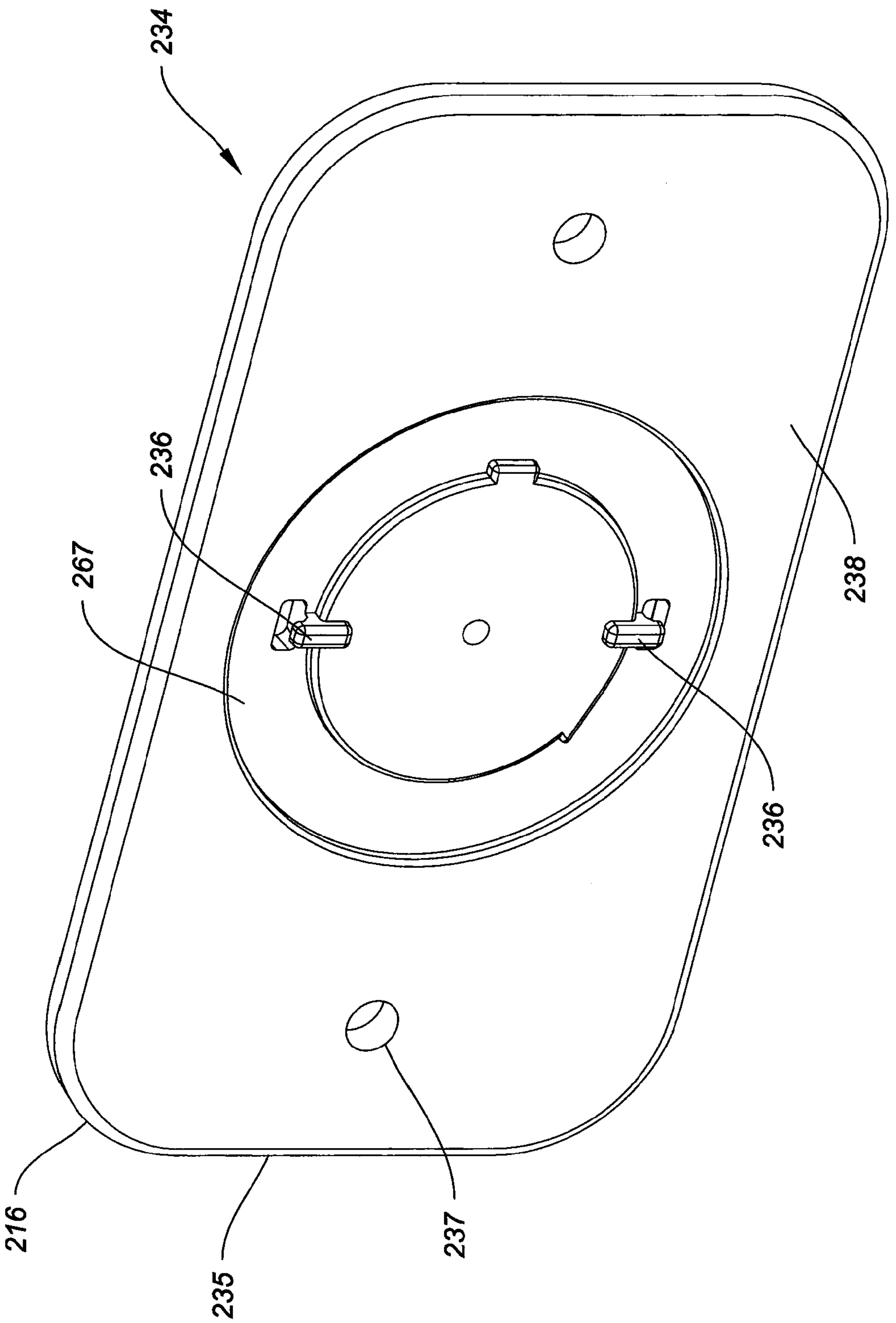
FIG. 11 is a perspective view of a plate for placing over the spring of FIG. 10.
Figure 12:
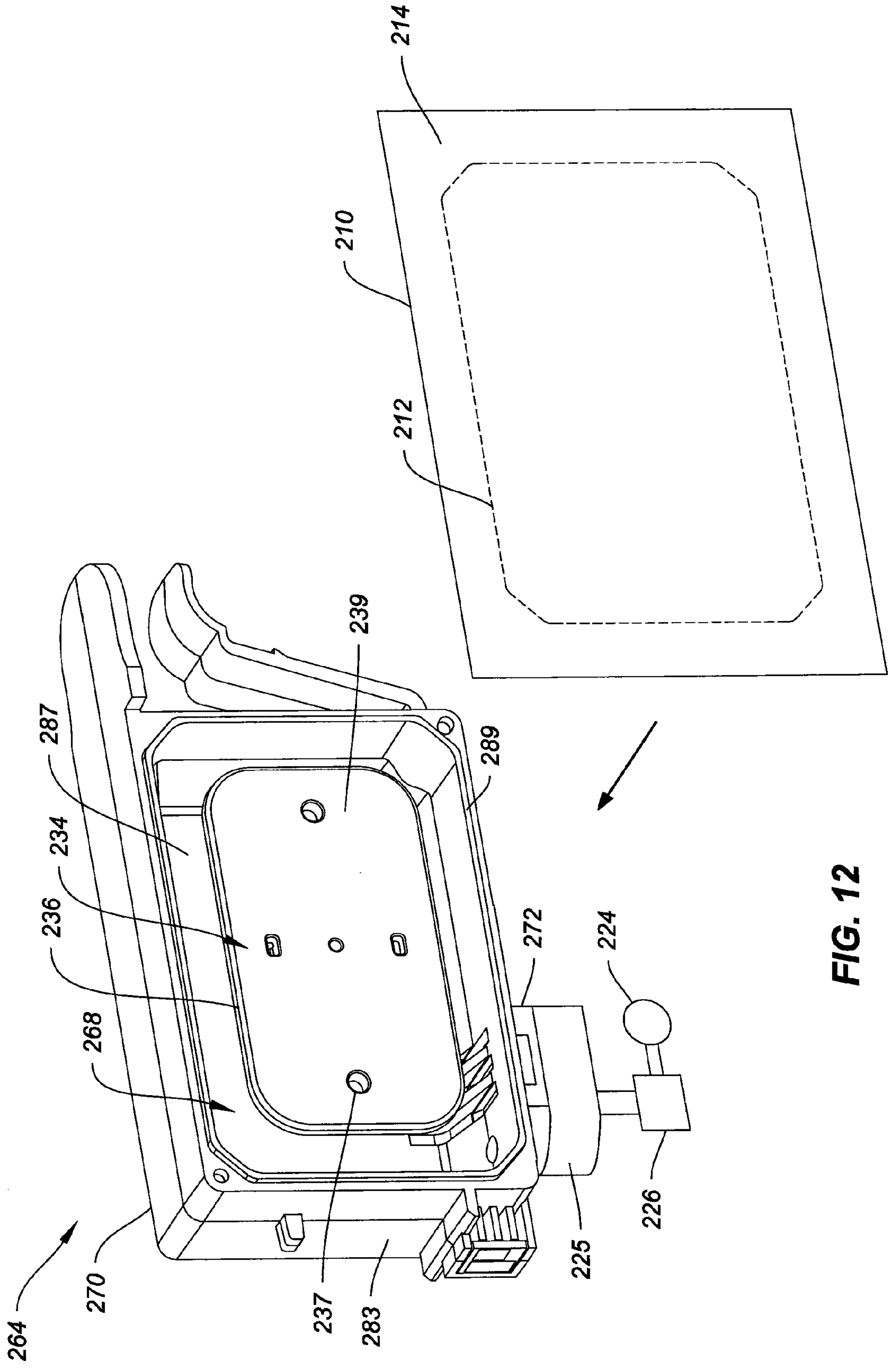
FIG. 12 is schematic view of a method of forming an ink tank reservoir according to an embodiment of the invention.

FIG. 12 schematically shows a flexible sheet 210 that is about to be attached to housing 270 to complete the enclosure for the ink reservoir according to an embodiment of the invention. Spring 232 (hidden) and plate 234 are positioned within housing 270. Plate 234 is undersized relative to side wall 283, so that there is a gap 268 between the perimeter 235 of plate 234 and the edge 289 of side wall 283. Gap 268 facilitates free movement of plate 234 back and forth relative to back wall 287. The first surface 238 of plate 234 that is shown in FIG. 11 faces back wall 287 in FIG. 12, so that the opposite second surface 239 of plate 234 faces outward. Flexible sheet 210 is moved in the direction of the arrow into contact with the edge 289 of side wall 283 of housing 270. Flexible sheet 210 is then affixed to edge 289, for example by welding while applying a first level of vacuum through port member 272. A coupling connection 225 is fitted to port member 272 and vacuum source 226 provides the first level of vacuum, as monitored for example by pressure gauge 224. The first level of vacuum helps flexible sheet to maintain contact in its attachment region 212 with edge 289 of side wall 283. Coupling connection 225 covers both ink outlet port 275 and ink fill port 278 (see FIG. 6) in the example shown in FIG. 12 so that vacuum can be applied to both the ink outlet port 275 and the ink fill port 278. In other embodiments (such as the one shown in FIG. 7 where ink fill port 278 is located separately from ink outlet port 275), the vacuum can be applied through the ink outlet port 275 while blocking off the ink fill port 278, or vacuum can be applied through the ink fill port 278 while blocking off the ink outlet port 275. Welding can be done by heat staking for example by bringing a heating element into contact with the flexible sheet 210 in the attachment region 212 that is in contact with edge 289 of side wall 283. Other ways to affix the sheet include ultrasonic welding, laser welding, or adhesive bonding. In order to provide a reliable weld joint, a layer of flexible sheet 210 facing edge 289 of side wall 283 should preferably be formed of a weldable material such as polyethylene. Housing 270 and plate 234 are also formed of a plastic material such as polyethylene that is chemically compatible with ink. To facilitate handling and placement of the flexible sheet 210, the flexible sheet 210 is typically larger than the perimeter of the housing 270 at edge 289 of side wall 283, so that an excess 214 of flexible sheet material extends beyond edge 289 (i.e. beyond welded attachment region 212). Excess 214 can be removed after affixing the flexible sheet 210 to edge 289, for example, by using a blade or a hot knife.

After the flexible sheet 210 has been welded to edge 289 it is formed into a convex shape in situ according to an embodiment of the present invention. Heat (typically at a lower temperature than used for heat staking) is applied to the flexible sheet 210 in the region of plate 234 and the vacuum level applied by vacuum source 224 is increased to a second level that is greater than the first level applied at the time of affixing the flexible sheet 210 to the edge 289 of side wall 283. Spring 232 (see FIG. 10) tends to push plate 234 outward and away from back wall 287, while the pressure differential between ambient air pressure outside the ink tank 264 relative to the partially evacuated reservoir 265 (see FIG. 9) tends to pull the flexible sheet 210 toward the back wall 287. The flexible sheet 210 is softened by the heat applied in the region of plate 234, such that the flexible sheet 210 deforms around plate 234 toward back wall 287 while the softened region in contact with plate 234 becomes thinner to provide the extra surface area as flexible sheet 210 changes from being substantially flat to being convex.

Figure 13:
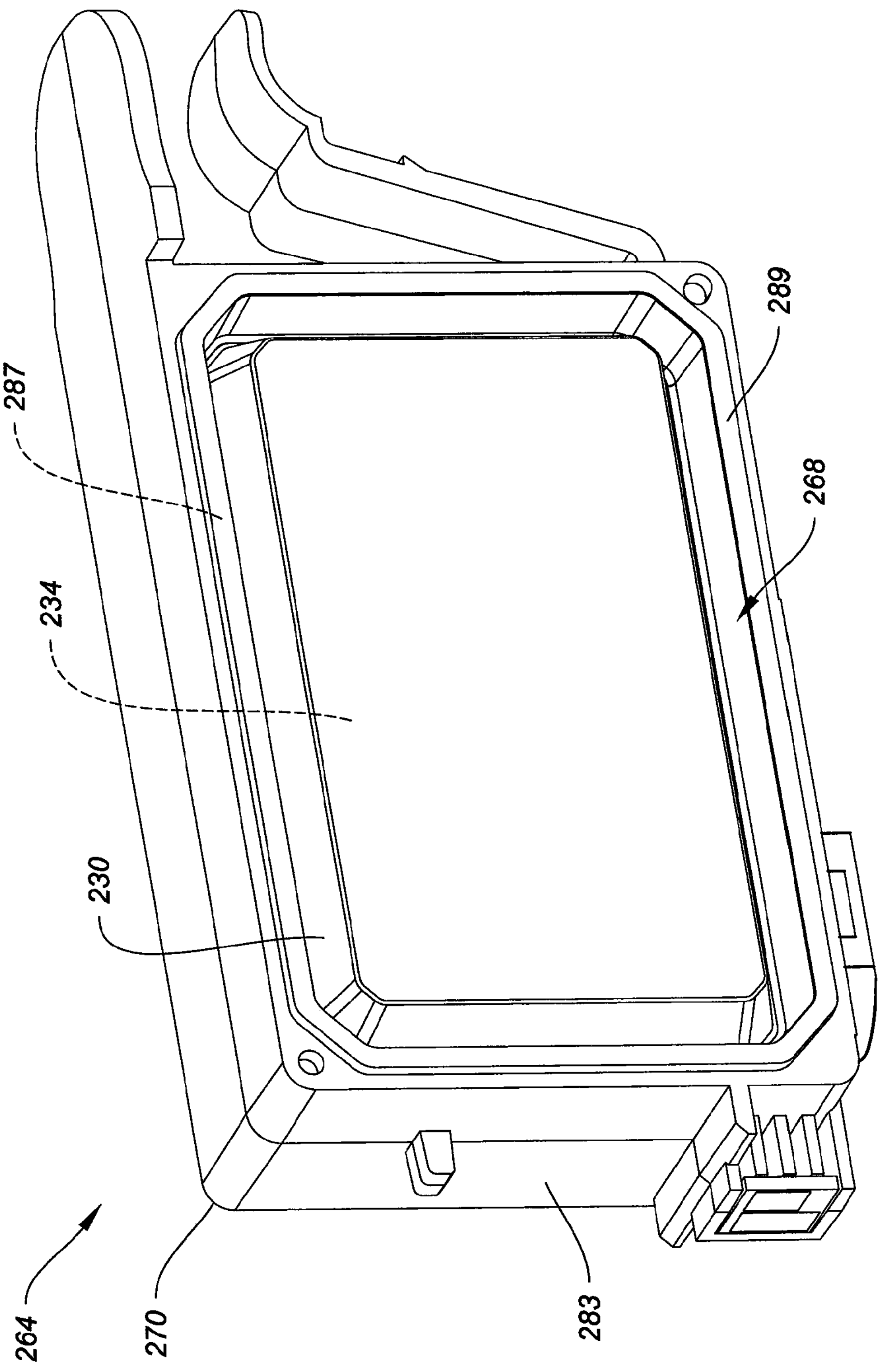
FIGS. 13 and 14 are perspective views of the ink tank housing of FIG. 10 with a flexible wall formed in situ according to an embodiment of the invention.

FIG. 13 shows the flexible wall 230 after it has been formed into a convex shape from flexible sheet 210. A portion of flexible wall 230 conforms to the somewhat rectangular shape of the second surface 239 of plate 234. During the in-situ forming process, another portion of flexible wall 230 stretches around the perimeter 235 of plate 234 into the gap 268 between perimeter 235 and side wall 283 to conform to the back wall 287 of housing 270 within the gap 268.

Figure 14:
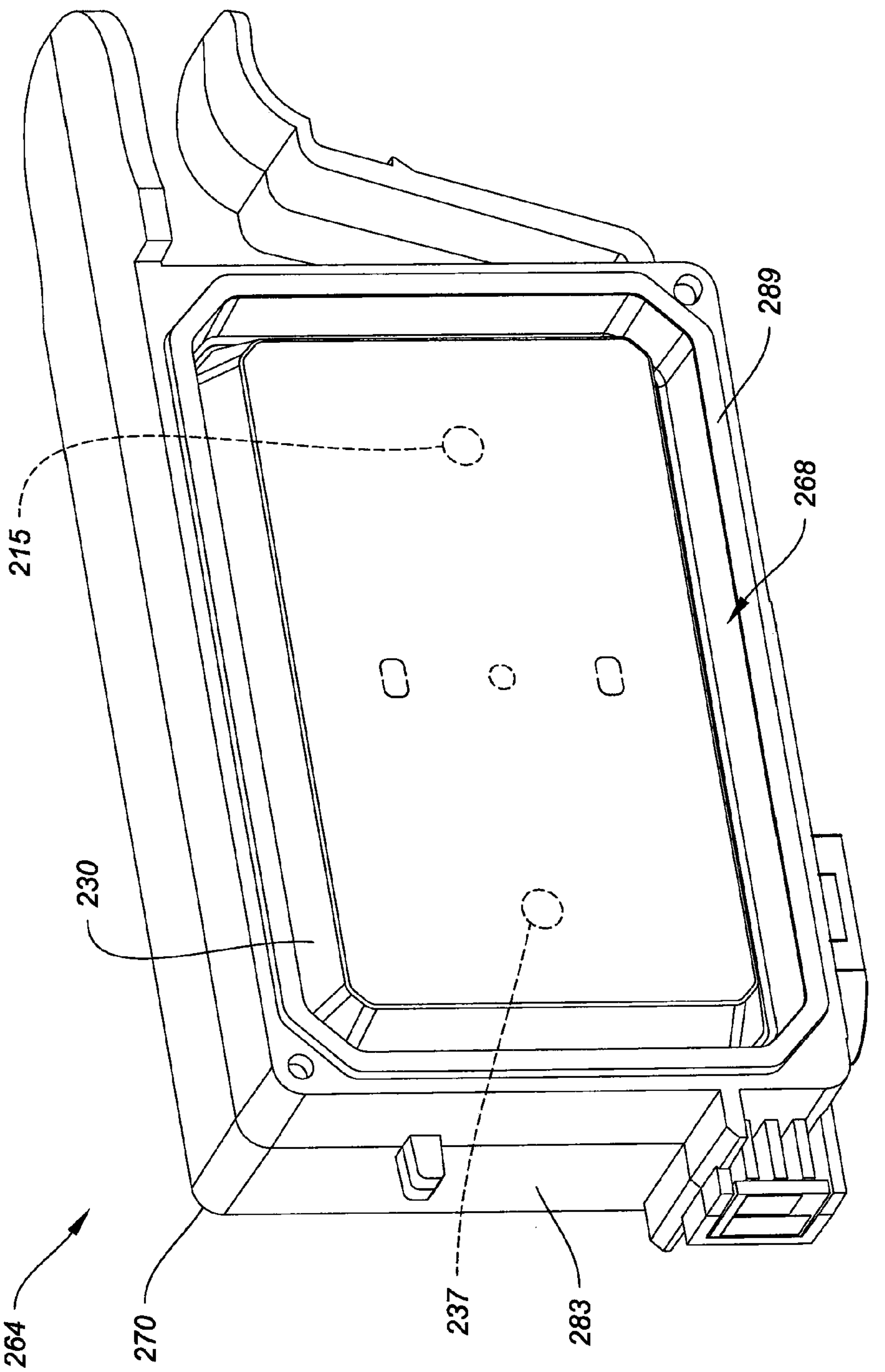

Although much of the material that is needed to provide the extra surface area comes from the thinned portion of the flexible sheet 210 that is in contact with plate 234, the plate provides additional support and can become thermally bonded to the polyethylene layer of flexible sheet 210 to provide additional structural integrity for flexible wall 230. An advantage of the in-situ forming process for flexible wall 230 is that plate 234 is captured by flexible wall 230 as it conforms around the perimeter 235, so that plate 234 is not allowed to shift laterally by a substantial amount. Capturing of the plate 234 is further enhanced by the thermal bonding of the flexible wall 230 to the plate 234. In addition, as shown in FIGS. 12 and 14, if plate 234 includes holes 237, the in-situ forming process can cause dimples 215 in flexible sheet 210 to protrude into holes 237, further constraining the lateral movement of plate 234.

Flexible wall 230 and spring 232 provide pressure regulation to ink enclosed in reservoir 265 (see FIG. 9). Geometry and materials of flexible sheet 210 as well as housing 270 and plate 234 can be selected according to the desired properties of the flexible wall 230 that is formed in situ according to embodiments of the present invention. It is desirable for flexible wall 230 to resist the passage of air through it so that the ink in reservoir 265 does not acquire excessive air in solution. In addition to the weldable layer of flexible sheet 210 described above to be placed into contact with the edge 289 of side wall 283 of housing 270, flexible sheet 210 can also include an oxygen-transmission-resistant barrier layer of nylon or EVOH (ethylene vinyl alcohol) that is not placed into contact with edge 289. In order for the flexible wall 230 to have sufficient flexibility, and yet not become excessively thinned during the in-situ forming process, it is preferable for the flexible sheet 210 to have a starting thickness of between 0.05 mm and 0.2 mm. With regard to geometries of the plate 234 and the internal regions of housing 270 that will be contacted by flexible wall 230, it is preferable not to have sharp corners that will lead to excessive thinning of flexible wall 230 during the in-situ forming process that can lead to failure in the flexible wall 230. Therefore, it is preferable that the corners 216 of plate 234 be rounded as shown in FIG. 11. Furthermore it is preferable that the internal corner 217 between the back wall 287 and side wall 283 of housing 270 be chamfered (see FIG. 9). Additionally, the chamfered internal corner 217 can include a first portion 218 of side wall 283 that is inclined at an angle between two degrees and eight degrees from a second portion 219 of the side wall 283, so that an angle between the hack wall 287 and the first portion 218 of the side wall is greater than ninety degrees.

Figure 15:
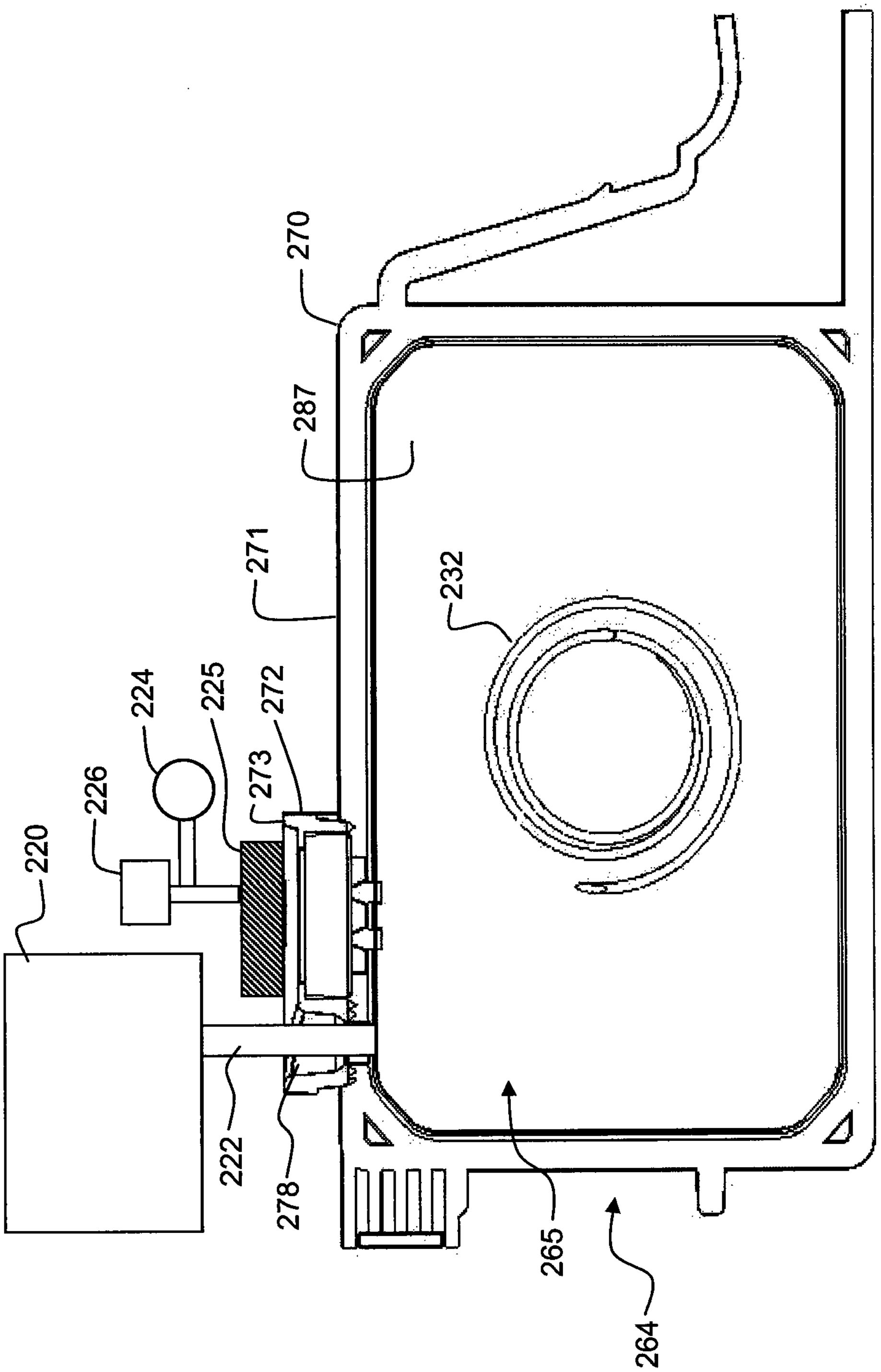
FIG. 15 is a schematic view of an ink filling process for an ink tank.
Figure 16:
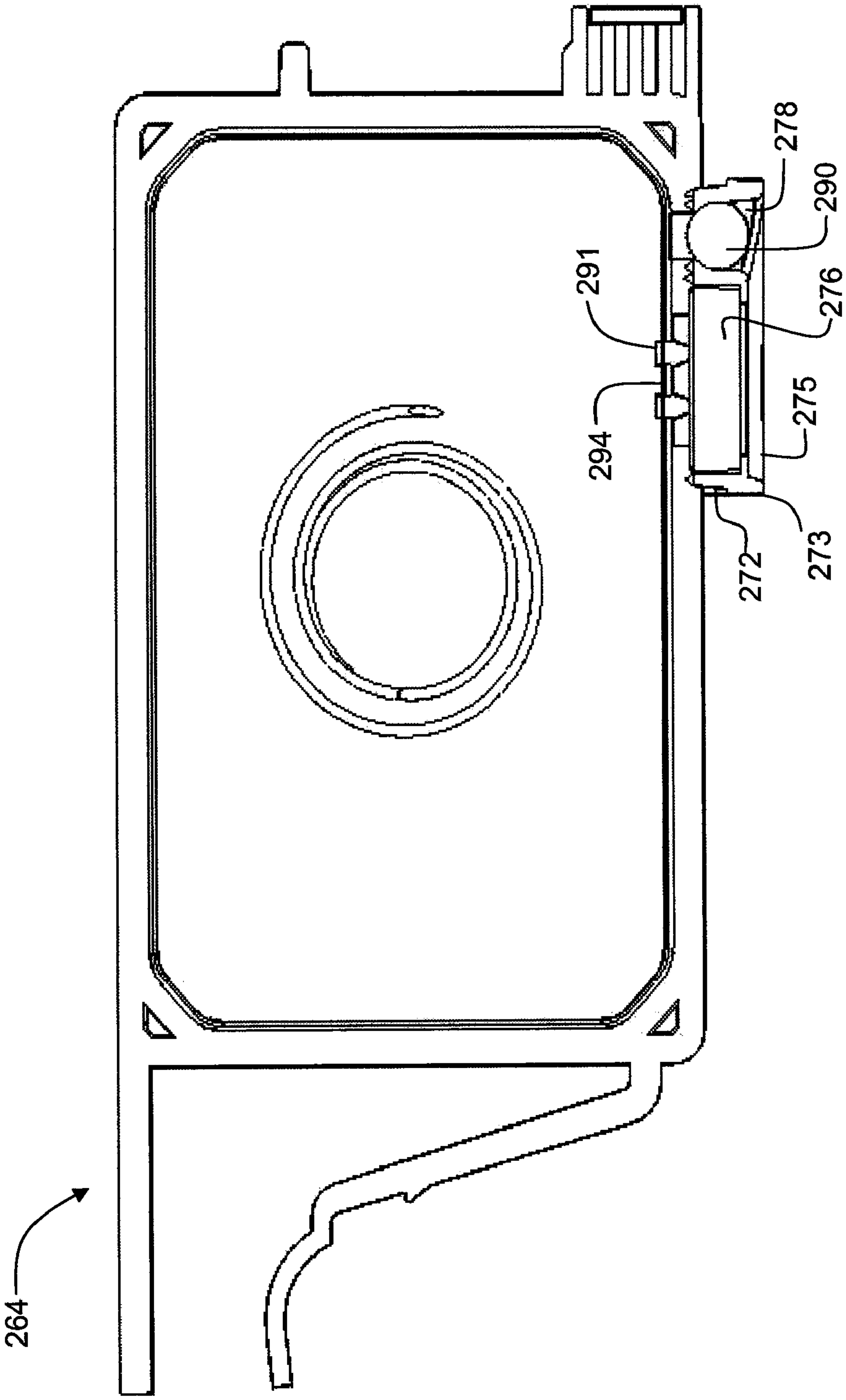
FIG. 16 is a cross sectional view of a filled ink tank.

A method of filling single chamber ink tank 264 with ink is shown schematically in FIG. 15 (including a cross-sectional view through A-A' of FIG. 8), with port member 272 facing upward. Reservoir 265 is evacuated by vacuum source 226 and plate 234 is pressed against back wall 287 of housing 270. As can be seen in FIG. 10 as well as FIG. 15, successive turns of spring 232 have successively smaller diameters than the diameter of the first end 231 of spring 232. In this way, the entire spring 232 can be accommodated within recess 266 in back wall 287 and recess 267 in plate 234, so that first surface 238 (FIG. 11) of plate 234 (i.e. an inner surface of plate 234) can touch back wall 287. Ink fill port 278 is configured to receive an ink fill tube 222 that is connected to ink source 220. At the beginning of ink fill, plate 234, spring 232 and flexible wall 230 are substantially compressed against rigid back wall 287 so that there is little air in reservoir 265. As ink flows into reservoir 265 from ink source 220 through ink fill tube 222, flexible wall 230 tends to expand outwardly from rigid back wall 287. When the ink fill process is completed and liquid ink has been provided to the reservoir, a plug 290, configured to seal ink fill port 278, is inserted into ink fill port 278, as shown in FIG. 16. Plug 290 can be a compliant ball, for example, and can be press fitted into ink fill port 278. Outer cover 285 (FIG. 7) is attached to housing 270 opposite back wall 287 such that plate 234, spring 232 and flexible wall 230 are between outer cover 285 and back wall 287 in order to provide protection for flexible wall 230 and ink reservoir 265.

The invention has been described in detail with particular reference to certain preferred embodiments thereof, but it will be understood that variations and modifications can be effected within the spirit and scope of the invention.

Parts List

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
210 Flexible sheet
212 Attachment region (to edge of side wall)
214 Excess
215 Dimple
216 Corner (of plate)
217 Internal corner (of housing)
218 First portion of side wall
219 Second portion of side wall
220 Ink source
222 Ink fill tube
224 Pressure gauge
225 Coupling connection
226 Vacuum source
230 Flexible wall
231 First end (of spring)
232 Spring
233 Second end (of spring)
234 Plate
235 Perimeter (of plate)
236 Hook
237 Hole (in plate)
238 First surface (of plate)
239 Second surface (of plate)
240 Standpipe
241 Region (for mounting multi-chamber ink tank)
242 Inlet port
243 Hole
244 Hole
245 End
246 Region (for mounting single chamber ink tank)
247 Gasket
249 Wall

250 Printhead
251 Printhead die
253 Nozzle array
254 Nozzle array direction
256 Encapsulant
257 Flex circuit
258 Connector board
262 Multi-chamber ink tank
264 Single-chamber ink tank
265 Reservoir
266 Recess (in back wall)
267 Recess (in plate)
268 Gap
270 Housing
271 Wall
272 Port member
273 Rim
274 Face
275 Ink supply port
276 Wick
278 Ink fill port
279 Wall
280 Pedestal
281 Electrical device
282 Electrical contacts
283 Side wall
284 Latching lever
285 Outer cover
286 Hole
287 Back wall
288 Protrusion
289 Edge (of side wall)
290 Plug
291 Ribs
292 Interior surface
294 Ink slots
300 Printer chassis
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
322 Turn roller
323 Idler roller
324 Discharge roller
325 Star wheel(s)
330 Maintenance station
370 Stack of media
371 Top piece of medium
380 Carriage motor
382 Carriage guide rail
383 Encoder fence
384 Belt
390 Printer electronics board
392 Cable connectors

The invention claimed is:

1. A method for forming a reservoir for holding ink in an ink tank for an inkjet printhead, the method comprising:

a) providing a housing including a back wall and a side wall extending from the back wall;

b) inserting a spring into the housing such that a first end of the spring contacts the back wall of the housing;

c) placing a first surface of a plate against a second end of the spring;

d) providing a flexible sheet;

e) bringing the flexible sheet into contact with the side wall of the housing containing the spring;

f) welding the flexible sheet to the edge of the side wall of the housing while applying a first level of vacuum between the flexible sheet and the back wall of the housing; and g) applying heat to the flexible sheet in a region corresponding to the plate while applying a second level of vacuum between the flexible sheet and the back wall of the housing, wherein the second level of vacuum is greater than the first level, thereby causing the sheet to conform to a second surface of the plate that is opposite the first surface of the plate, as well as to internal features of the housing.

2. The method according to claim 1, wherein the steps of applying the first level of vacuum and the second level of vacuum further comprise applying vacuum through an outlet port.

3. The method according to claim 1, the housing further comprising an ink fill port, wherein the steps of applying the first level of vacuum and the second level of vacuum further comprise blocking an outlet port and applying vacuum through the ink fill port.

4. The method according to claim 1, wherein the step of welding the flexible sheet to the edge of the side wall further comprises heat staking.

5. The method according to claim 1 further comprising removing excess flexible sheet extending beyond an edge of the side wall, after the flexible sheet is welded to the edge.

6. The method according to claim 5, wherein the step of removing excess flexible sheet further comprises using a blade.

7. The method according to claim 5, wherein the step of removing excess flexible sheet further comprises using a hot knife.

8. The method according to claim 1, wherein the step of applying heat to the flexible sheet in the region corresponding to the plate further causes a portion of the flexible sheet to become affixed to the plate.

9. The method according to claim 1, wherein the step of applying heat to the flexible sheet in the region corresponding to the plate while applying the second level of vacuum further causes a portion of the flexible sheet in the region of the plate to become thinner, while a surface area of the flexible sheet increases beyond the plate.

10. The method according to claim 1, wherein a starting thickness of the flexible sheet is between 0.05 mm and 0.2 mm.

11. The method according to claim 1, wherein an internal corner between the back wall and the side wall of the housing is chamfered.

12. The method according to claim 1 further comprising attaching an outer cover to the housing opposite the back wall.

* * * * *